US012617633B2

(12) United States Patent
Garcia Delgado et al.

(10) Patent No.: US 12,617,633 B2
(45) Date of Patent: May 5, 2026

(54) EFFECTIVE HANDLING OF SCRAP MATERIAL WITH SWARM ROBOTS

(71) Applicant: INTERNATIONAL BUSINESS MACHINES CORPORATION, Armonk, NY (US)

(72) Inventors: Carolina Garcia Delgado, Zapopan (MX); Vinod A. Valecha, Pune (IN); Sarbajit K. Rakshit, Kolkata (IN); Tushar Agrawal, West Fargo, ND (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 18/357,258

(22) Filed: Jul. 24, 2023

(65) Prior Publication Data

US 2025/0033904 A1     Jan. 30, 2025

(51) Int. Cl.
B65G 49/00          (2006.01)
B29C 64/393         (2017.01)
(Continued)

(52) U.S. Cl.
CPC ............ B65G 49/00 (2013.01); B29C 64/393 (2017.08); B33Y 50/02 (2014.12); B33Y 80/00 (2014.12);
(Continued)

(58) Field of Classification Search
CPC ........ B65G 49/00; B33Y 50/02; B33Y 80/00; G06T 7/70; B29C 64/393
(Continued)

(56) References Cited

U.S. PATENT DOCUMENTS 4,270,657 A * 6/1981 Bayon ...................... D04G 1/00
                                                    206/386
9,636,871 B2 5/2017 Butler
(Continued)

FOREIGN PATENT DOCUMENTS

CN        211254465 U     8/2020
WO    2019215180 A1    11/2019

OTHER PUBLICATIONS

A-1 Dumpster, A-1 Dumpster Use & Service Agreement (Dec. 2020), retrieved from https://web.archive.org/web/20201203072308/ https://www.a1dumpstersva.com/dumpster-use-service-agreement/ on Oct. 15, 2025. (Year: 2020).*
(Continued)

*Primary Examiner* — Mohammad Ali
*Assistant Examiner* — Joshua T Sanders
(74) *Attorney, Agent, or Firm* — Stosch Sabo

(57) ABSTRACT

An embodiment for handling scrap material with swarm robots in a multi-machine environment is provided. The embodiment may include receiving images of scrap material in a multi-machine environment. The embodiment may also include dividing the scrap material into a plurality of zones. The embodiment may further include identifying one or more characteristics of the divided scrap material in at least one zone of the plurality of zones. The embodiment may also include in response to determining the divided scrap material is in a target location in the at least one zone: printing a net around the divided scrap material in the at least one zone in accordance with the one or more characteristics of the divided scrap material; and transporting the net containing the divided scrap material in the at least one zone to a final destination.

15 Claims, 3 Drawing Sheets

(51) Int. Cl.

| | |
|---|---|
| *B29L 28/00* | (2006.01) |
| *B33Y 50/02* | (2015.01) |
| *B33Y 80/00* | (2015.01) |
| *B64U 10/13* | (2023.01) |
| *B64U 101/30* | (2023.01) |
| *G06T 7/70* | (2017.01) |

(52) U.S. Cl.
   CPC ............. *G06T 7/70* (2017.01); *B29L 2028/00* (2013.01); *B64U 10/13* (2023.01); *B64U 2101/30* (2023.01); *G06T 2207/20021* (2013.01); *G06T 2207/20081* (2013.01)

(58) Field of Classification Search
   USPC ........................................................ 700/118
   See application file for complete search history.

(56) References Cited

U.S. PATENT DOCUMENTS

| | | | | |
|---|---|---|---|---|
| 10,093,454 B1* | 10/2018 | Kalyan | .................. | A47G 29/12 |
| 10,579,071 B1 | 3/2020 | Li | | |
| 11,341,289 B2 | 5/2022 | Coskun | | |
| 2007/0081859 A1* | 4/2007 | Bussey | ................. | E02B 11/005 |
| | | | | 405/45 |
| 2010/0178104 A1* | 7/2010 | Bare | ........................ | E01F 13/12 |
| | | | | 404/6 |
| 2017/0168496 A1* | 6/2017 | Yamamoto | ........... | G05D 1/0212 |
| 2017/0190104 A1* | 7/2017 | Bostick | ................. | B29C 64/106 |
| 2020/0407117 A1* | 12/2020 | Jäger | ....................... | E02B 3/127 |
| 2021/0051862 A1* | 2/2021 | Sharkey | ................ | B65F 1/0006 |
| 2022/0143911 A1* | 5/2022 | Zhou | ...................... | B29C 64/379 |
| 2022/0161497 A1* | 5/2022 | Karri | ...................... | B33Y 50/02 |
| 2022/0380072 A1 | 12/2022 | Brinkmeyer | | |
| 2023/0082558 A1* | 3/2023 | Gray | ....................... | E02B 15/10 |
| | | | | 56/8 |

OTHER PUBLICATIONS

Caplugs, "Nothing but Net—How Plastic Netting Is a Slam Dunk for Product Protection", https://www.caplugs.com/netting-product-protection, Accessed on Jun. 8, 2023, 4 Pages.

Cults, "Identify and Correct 3D Printing Problems", https://cults3d.com/en/blog/articles/identify-correct-3D-printing-problems-defaults, Accessed on Jun. 8, 2023, 22 Pages.

Dwamena, "How to Fix Broken 3D Printed Parts—PLA, ABS, PETG, TPU", https://3dprinterly.com/how-to-fix-broken-3d-printed-parts/, Accessed on Jun. 8, 2023, 21 Pages.

Equinox's Drones, "How Drones are Helping with Waste Management", https://www.equinoxsdrones.com/blog/how-drones-are-helping-with-waste-management, Accessed on Jun. 8, 2023, 13 Pages.

IBM Lighthouse, "Shifting transport paradigms: Understanding the implications of 3D printing on the global transportation industry", https://w3.ibm.com/services/lighthouse/documents/39220, Accessed on Jun. 8, 2023, 4 Pages.

IBM, "IBM Watson Health is now Merative", https://www.ibm.com/watson-health/merative-divestiture, Accessed on Jun. 8, 2023, 3 Pages.

IBM, Latest Release of IBM iConnect Access Provides Foundation for Planned Future 3D Printing Solution, IBM, https://newsroom.ibm.com/2021-05-24-Latest-Release-of-IBM-iConnect-Access-R-Provides-Foundation-for-Planned-Future-3D-Printing-Solution, May 24, 2021, 4 Pages.

Iyengar et al., Connected products at the edge, IBM, https://www.ibm.com/blog/connected-products-at-the-edge/, May 31, 2013, 14 Pages.

Ventre, "How 3D Printing Could Help to Regrow Teeth from the Root", ttps://www.azom.com/article.aspx?ArticleID=20487, Jun. 8, 2021, 5 Pages.

Karen Lewis, "Dehyping Robotics and Artificial Intelligence (AI)", https://web.archive.org/web/20230208015804/ https://www.ibm.com/blogs/internet-of-things/dehyping-robotics/, Mar. 21, 2017, 15 pages.

No Author, "IBM iConnect Access", https://web.archive.org/web/20220125172638/https://www.ibm.com/products/iconnect-access, Jan. 25, 2022, 6 pages.

* cited by examiner

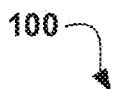

100

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

MATERIAL HANDLING PROGRAM 150

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

FIG. 1

EFFECTIVE HANDLING OF SCRAP MATERIAL WITH SWARM ROBOTS

BACKGROUND

The present invention relates generally to the field of computing, and more particularly to a system for handling scrap material with swarm robots in a multi-machine environment.

Mid-tier netting offers a balance of size and flexibility, thereby allowing for wrapping objects such as glass rods, tubing, storage tanks, and/or paper products. Additionally, larger netting is often used to protect automotive parts such as transmission and/or engine components. In an industrial area, netting may be used to wrap various objects. These objects may be of different types and sizes. For example, different types of scrap material may be dumped into the industrial area and may need to be moved to another location.

SUMMARY

According to one embodiment, a method, computer system, and computer program product for handling scrap material with swarm robots in a multi-machine environment is provided. The embodiment may include receiving images of scrap material in a multi-machine environment. The embodiment may also include dividing the scrap material into a plurality of zones based on the images. The embodiment may further include identifying one or more characteristics of the divided scrap material in at least one zone of the plurality of zones. The embodiment may also include in response to determining the divided scrap material is in a target location in the at least one zone: printing a net around the divided scrap material in the at least one zone in accordance with the one or more characteristics of the divided scrap material; and transporting the net containing the divided scrap material in the at least one zone to a final destination.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary computing environment according to at least one embodiment.

DETAILED DESCRIPTION

Figure 2:
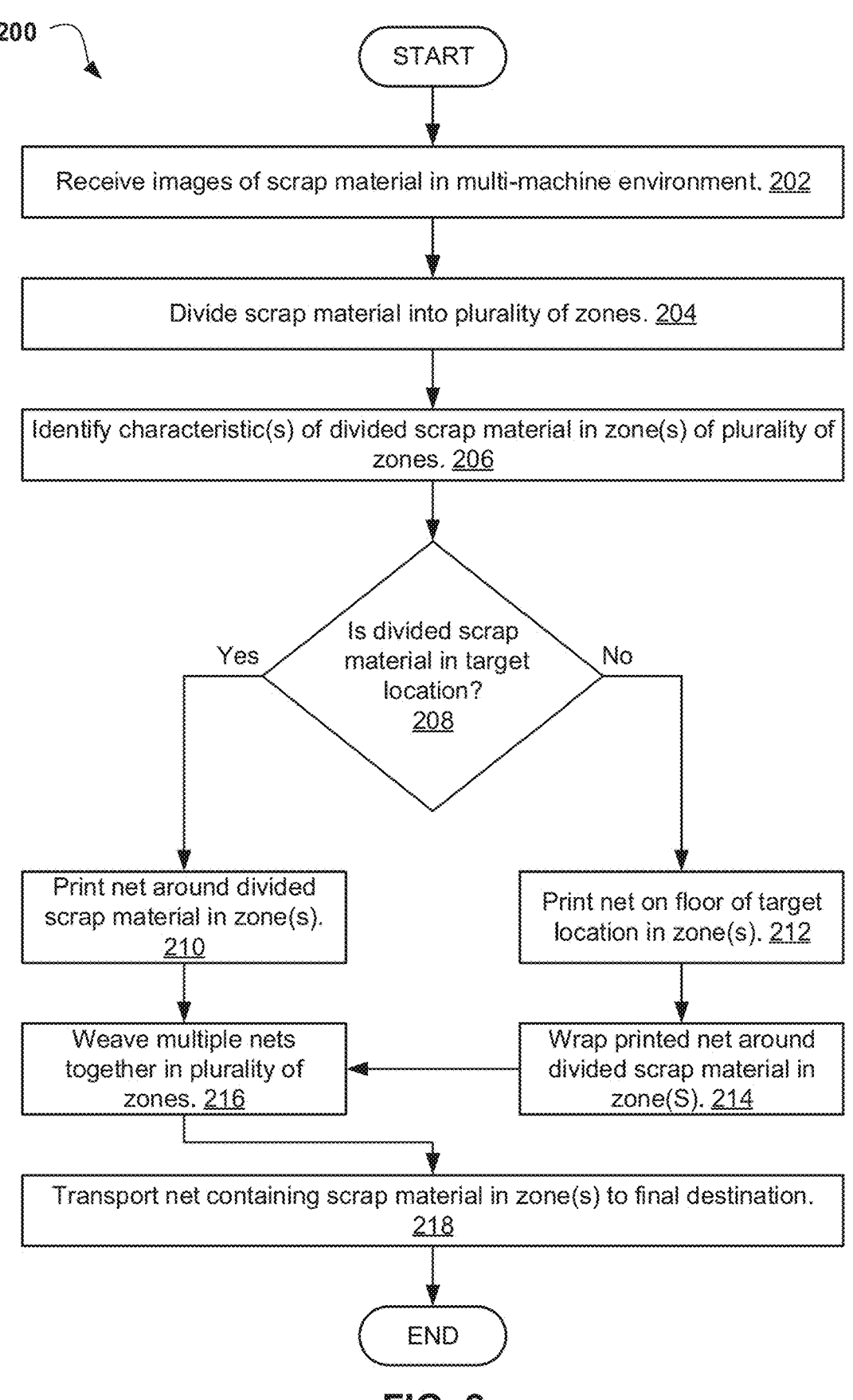
FIG. 2 illustrates an operational flowchart for handling scrap material with swarm robots in a multi-machine environment in a scrap material handling process according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for handling scrap material with swarm robots in a multi-machine environment. The following described exemplary embodiments provide a system, method, and program product to, among other things, identify one or more characteristics of divided scrap material in at least one zone of a plurality of zones and, accordingly, in response to determining the scrap material is in a target location in the at least one zone, print a net around the divided scrap material in the at least one zone in accordance with the one or more characteristics. Therefore, the present embodiment has the capacity to improve 3D printing technology by providing the required strength and stability for transporting scrap material in any multi-machine environment.

As previously described, mid-tier netting offers a balance of size and flexibility, thereby allowing for wrapping objects such as glass rods, tubing, storage tanks, and/or paper products. Additionally, larger netting is often used to protect automotive parts such as transmission and/or engine components. In an industrial area, netting may be used to wrap various objects. These objects may be of different types and sizes. For example, different types of scrap material may be dumped into the industrial area and may need to be moved to another location. The various sizes of the scrap material make it difficult to properly handle such material. This problem is typically addressed by utilizing a one-size-fits-all packaging that stacks products into units. However, a one-size-fits-all packaging fails to provide adequate protection for objects of different dimensions.

It may therefore be imperative to have a system in place to provide adequate protection for scrap material having different dimensions. Thus, embodiments of the present invention may provide advantages including, but not limited to, providing the required strength and stability for transporting scrap material in any multi-machine environment, utilizing machine learning to optimize net designs, and allowing for the efficient and effective use of scrap material. The present invention does not require that all advantages need to be incorporated into every embodiment of the invention.

According to at least one embodiment, in a multi-machine environment of robotic devices, images of scrap material may be received in order to divide the scrap material into a plurality of zones based on the images. Upon dividing the scrap material, one or more characteristics of the divided scrap material in at least one zone of the plurality of zones may be identified so that it may be determined whether the divided scrap material is in a target location in the at least one zone. According to at least one embodiment, in response to determining the divided scrap material is in the target location in the at least one zone, a net may be printed around the divided scrap material in the at least one zone in accordance with the one or more characteristics such that the net containing the scrap material in the at least one zone may be transported to a final destination.

According to at least one other embodiment, in response to determining the divided scrap material is not in the target location in the at least one zone, the net may be printed on a floor of the target location in the at least one zone in accordance with the one or more characteristics in order to wrap the printed net around the divided scrap material in the at least one zone in response to determining the divided scrap material has been dropped in the target location. Then, the net containing the scrap material in the at least one zone may be transported to the final destination. In either embodiment, multiple nets may be weaved together in the plurality of zones in response to determining at least two nets are printed in the plurality of zones.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to identify one or more characteristics of divided scrap material in at least one zone of a plurality of zones and, accordingly, in response to determining the scrap material is in a target location in the at least one zone, print a net around the divided scrap material in the at least one zone in accordance with the one or more characteristics.

Referring to FIG. 1, an exemplary computing environment 100 is depicted, according to at least one embodiment. Computing environment 100 contains an example of an environment for the execution of at least some of the computer code involved in performing the inventive methods, such as a material handling program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. Peripheral device set 114 may also include an automated guided vehicle (AGV), a robotic device, a conveyor belt, a crane, a lift, and/or any other device for performing labor related tasks.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the material handling program 150 may be a program capable of receiving images of scrap material in a multi-machine environment, identifying one or more characteristics of divided scrap material in at least one zone of a plurality of zones, printing a net around the divided scrap material in the at least one zone in accordance with the one or more characteristics, providing the required strength and stability for transporting scrap material in any multi-machine environment, utilizing machine learning to optimize net designs, and allowing for the efficient and effective use of scrap material. Furthermore, notwithstanding depiction in computer 101, the material handling program 150 may be stored in and/or executed by, individually or in any combination, end user device 103, remote server 104, public cloud 105, and private cloud 106. The material handling method is explained in further detail below with respect to FIG. 2.

Figure 3:
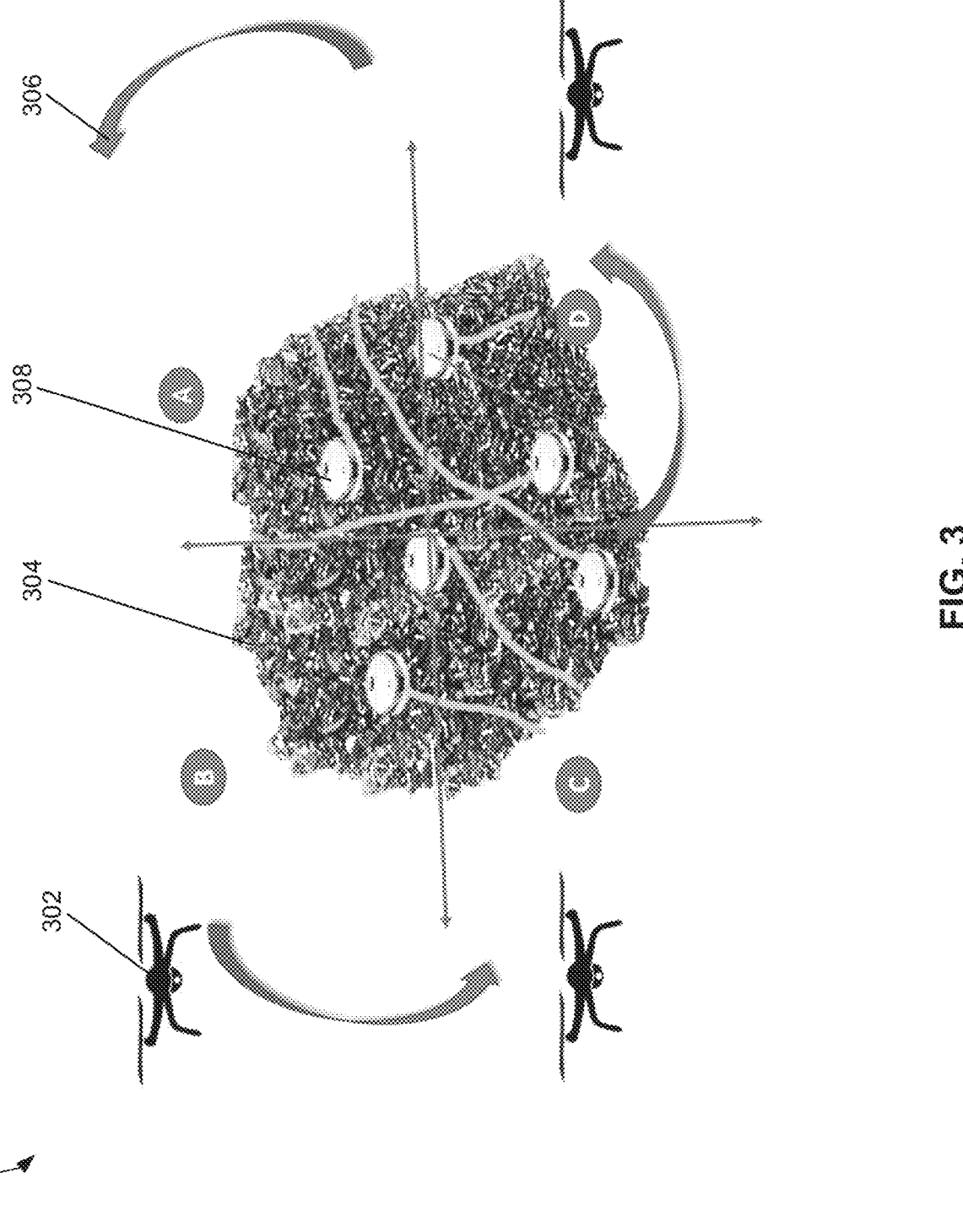
FIG. 3 is an exemplary diagram depicting swarm robots wrapping scrap material within a plurality of zones according to at least one embodiment.

Referring now to FIG. 2, an operational flowchart for handling scrap material with swarm robots in a multi-machine environment in a scrap material handling process 200 is depicted according to at least one embodiment. At 202, the material handling program 150 receives the images of scrap material in the multi-machine environment. Examples of the scrap material may include, but are not limited to, metals, plastics, rubber, and/or other industrial waste products. The images may be received from a drone equipped with a video camera. The drone may travel around the scrap material and record images, as illustrated in FIG. 3. For example, the drone may travel around a pile of scrap material including automotive parts.

Then, at 204, the material handling program 150 divides the scrap material into a plurality of zones. The scrap material is divided based on the images. The video camera may be utilized by the material handling program 150 to divide the scrap material into the plurality of zones. For example, the scrap material may be divided into four zones, such as Zone A, Zone B. Zone C, and Zone D, as illustrated in FIG. 3. The plurality of zones may be equal in area. For example, each zone may have an area of approximately 10 feet.

Next, at 206, the material handling program 150 identifies the one or more characteristics of the divided scrap material in the at least one zone of the plurality of zones. It may be appreciated that in embodiments of the present invention, the one or more characteristics of the scrap material may be identified per zone. For example, the one or more characteristics may be identified in each of Zone A, Zone B, Zone C, and Zone D. Examples of the characteristic may include, but are not limited to, the type of scrap material (e.g., metal and/or plastic), the dimensions of the scrap material (e.g., length, width, and height), and the weight of the scrap material.

According to at least one embodiment, the identified one or more characteristics may include dimensions of a largest and a smallest item of scrap material. In this embodiment, the scrap material may be too numerous to identify the dimensions of each item individually. Thus, in some embodiments it may suffice to only identify the dimensions of the largest and the smallest item of scrap material.

Then, at 208, the material handling program 150 determines whether the divided scrap material is in the target location in the at least one zone. The material handling program 150 may be integrated with a central database, such as remote database 130, that serves as a repository for information on a location and status of each item of scrap material. For example, a particular item of scrap material may be located on a dump truck en route to the industrial facility. The target location may be a location in the at least one zone where the divided scrap material is sent to be wrapped by the net. Continuing the example described above, when the scrap material is on the dump truck en route to the industrial facility, the divided scrap material may not be in the target location.

In response to determining the divided scrap material is in the target location in the at least one zone (step 208, "Yes" branch), the scrap material handling process 200 proceeds to step 210 to print the net around the divided scrap material in the at least one zone in accordance with the one or more characteristics of the divided scrap material. In response to determining the divided scrap material is not in the target location in the at least one zone (step 208, "No" branch), the scrap material handling process 200 proceeds to step 212 to print the net on the floor of the target location in the at least one zone in accordance with the one or more characteristics of the divided scrap material.

Next, at 210, the material handling program 150 prints the net around the divided scrap material in the at least one zone. One net may be printed per zone. The net is printed around the divided scrap material in accordance with the one or more characteristics of the divided scrap material. Specifically, the one or more characteristics may be utilized to determine the specifications of the net. The specifications of the net may include, but are not limited to, diameter of the thread, grid density, and a material for the thread (e.g., polymers, metals, and/or a composite material). For example, the material for the thread may be plastic with a diameter of three inches. The specifications of the net may be able to handle the weight and dimensions of the divided scrap material. A space between the threads of the net may be smaller than the dimensions of the smallest item of scrap material. The material for the thread may be selected based on the application of the divided scrap material in the net. For example, where the net is to be used in an area with high winds, the material may have a high tensile strength to withstand the pressure. In another example, where the net is to be used in a marine environment, the material may be resistant to corrosion and degradation due to water exposure. Additionally, the material may be designed to be easily removable for recycling or disposal of the divided scrap material. For example, the design of the material may include perforations and/or biodegradable material. Furthermore, the material may be designed to reduce the amount of dust generated by the divided scrap material during transportation and/or provide insulation for the divided scrap material. The specifications of the net may also be stored in the central database, such as remote database 130.

According to at least one embodiment, a reinforcement learning model may be utilized by the material handling program 150 to predict the one or more specifications of the net. The reinforcement learning model may predict the one or more specifications of the net based on the one or more characteristics of the divided scrap material and the performance of previous net designs. For example, a net printed in the past having a two-inch diameter may have torn while transporting the divided scrap materials. Continuing the example, when similar divided scrap materials are to be wrapped in the present, the reinforcement learning model may predict the minimum diameter of the thread should be three inches. Through reinforcement learning, the material handling program 150 may continuously learn and optimize the net design based on feedback from the environment. For example, where a certain net design proves to be effective in handling the divided scrap material and reducing waste, the reinforcement learning model may receive a reward to encourage continued use of the design. Contrarily, where a certain design is not effective, the reinforcement learning model may receive a penalty to adapt the net design.

According to at least one other embodiment, the net may be printed by multiple robotic 3D printers operating simultaneously in the plurality of zones. Specifically, the robotic 3D printers may perform spray printing around the divided scrap material in the at least one zone in a collaborative manner. At least one robotic 3D printer may be deployed in each zone to print the net. To reach the inner portions of the at least one zone, the robotic 3D printers may enter the at least one zone by moving a portion of the divided scrap material aside to form a pathway. The robotic 3D printers may be equipped with sensors (e.g., LiDAR) to detect the position and orientation of the divided scrap material. The robotic 3D printers may prioritize certain areas within the at least one zone based on the importance of the items of the divided scrap material.

According to at least one further embodiment, the multiple robotic 3D printers may execute one or more movements in accordance with a color-coded area in the plurality of zones. The robotic 3D printers may coordinate their movements to avoid collisions and ensure complete coverage of the divided scrap material. The one or more movements may be executed consistent with values for ranges of movements in a table. For example, the table may be as follows:

| Robot | X | Y | Z |
|---|---|---|---|
| R1 | 10 m (Zone A) | 50 m (Zone A) | 35 m (Zone A) |
| R2 | −30 m (Zone B) | 30 m (Zone B) | 10 m (Zone B) |

In the table, R1 and R2 may represent the IDs of the robotic 3D printers, X, Y, and Z may represent planes, and the values may represent movements in the different planes for each zone. For example, to avoid a collision, robotic 3D printer R1 may move a maximum of 10 meters in the X-plane within Zone A, 50 meters in the Y-plane in Zone A, and 35 meters in the Z-plane in Zone A. Continuing the example, robotic 3D printer R2 may move a maximum of −30 meters in the X-plane within Zone B, 30 meters in the Y-plane within Zone B, and 10 meters in the Z-plane within Zone B. The areas within each zone where the multiple robotic 3D printers may move may be a green area, and the areas within each zone where the multiple robotic 3D printers may not move may be a red area. When two or more robotic 3D printers are near each other in the same zone such that the red areas of the two or more robotic 3D printers overlap, the material handling program 150 may control at least one of the robotic 3D printers to move to another area in the same or a different zone.

Then, at 212, the material handling program 150 prints the net on the floor of the target location in the at least one zone. The net is printed on the floor in accordance with the one or more characteristics of the divided scrap material. When the divided scrap material is not in the target location in the at least one zone, the net may be proactively printed on the floor of the target location. The net may be printed as described above with respect to step 210. However, in this embodiment the multiple robotic 3D printers may proactively perform the spray printing on the floor of the target location before the scrap material is dropped in the target location.

Next, at 214, the material handling program 150 wraps the printed net around the divided scrap material in the at least one zone in response to determining the divided scrap material has been dropped in the target location. The multiple robotic 3D printers may execute the same one or more movements as described above with respect to step 210 to pick up and wrap the divided scrap material with the proactively printed net.

According to at least one embodiment, as the multiple robotic 3D printers are wrapping the divided scrap material with the proactively printed net, the multiple robotic 3D printers may monitor their health and upload this health data to the central database, such as remote database 130. The health data may include information about necessary repairs and/or maintenance to complete the printing of the net and wrapping of the divided scrap material.

Then, at 216, the material handling program 150 weaves the multiple nets together in the plurality of zones in response to determining the at least two nets are printed in the plurality of zones. As described above with respect to step 210, one net may be printed per zone. The multiple nets in at least two different zones may be weaved together. For example, where the plurality of zones include Zone A, Zone B, Zone C, and Zone D, the nets in Zones A and B may be weaved together. Continuing the example, the nets in Zones C and D may be weaved together. In another example, the nets in Zones A, B, C, and D may all be weaved together. Thus, the nets in different zones may be weaved together in a variety of combinations.

According to at least one embodiment, one or more secondary robotic 3D printers may be deployed to weave the multiple nets together. The one or more secondary robotic 3D printers may be smaller in size than the multiple robotic 3D printers that are responsible for printing the net. The one or more secondary robotic 3D printers may be deployed to weave the multiple nets together when the multiple robotic 3D printers are positioned at the periphery of the plurality of zones.

Next, at 218, the material handling program 150 transports the net containing the divided scrap material in the at least one zone to the final destination in the multi-machine environment. In order to transport the net containing the divided scrap material in the at least one zone, one or more modes of transport may be determined based on the one or more characteristics of the divided scrap materials, the layout of the multi-machine environment, and the distance to be covered in moving the divided scrap material.

According to at least one embodiment, a conveyor belt may be utilized to transport the net containing the divided scrap material in the at least one zone to the final destination. The conveyor belt may move the net from the target location where the multiple robotic 3D printers print the net to a centralized storage area.

According to at least one other embodiment, the AGV may transport the net containing the divided scrap material in the at least one zone to the final destination. The AGV may follow a specified path to deliver the net from the target location where the multiple robotic 3D printers print the net to the centralized storage area. Additionally, cranes, lifts, and/or chutes may be utilized to transport the net containing the divided scrap material in the at least one zone to the final destination.

According to at least one further embodiment, when the at least two nets are printed in the plurality of zones, the multiple nets that are weaved together may be transported in the same manner as described above to the final destination.

Referring now to FIG. 3, an exemplary diagram 300 depicting swarm robots 308 wrapping scrap material 304 within a plurality of zones A, B, C, D is shown according to at least one embodiment. In the diagram 300, the drone 302 may be flying around the scrap material 304 to record the images of the scrap material 304. Arrow 306 indicates the direction of movement of the drone 302 around the scrap material 304. The scrap material 304 may be divided into the plurality of zones A, B, C, D. The multiple robotic 3D printers 308 may operate simultaneously in the plurality of zones A, B, C, D to print the net around the scrap material 304. As illustrated in the diagram 300, at least one robotic 3D printer 308 may operate in each of the plurality of zones A, B, C, D to print the net.

It may be appreciated that FIGS. 2 and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of handling scrap material with swarm robots in a multi-machine environment, the method comprising:

receiving images of scrap material in a multi-machine environment;

dividing the scrap material into a plurality of zones based on the images;

identifying one or more characteristics of the divided scrap material in at least one zone of the plurality of zones;

determining whether the divided scrap material is in a target location in the at least one zone;

in response to determining the divided scrap material is in the target location in the at least one zone:

printing a net around the divided scrap material in the at least one zone in accordance with the one or more characteristics of the divided scrap material; and transporting the net containing the divided scrap material in the at least one zone to a final destination; and in response to determining the divided scrap material is not in the target location in the at least one zone:

printing the net on a floor of the target location in the at least one zone in accordance with the one or more characteristics of the divided scrap material, wherein a reinforcement learning model is utilized to predict one or more specifications of the net;

wrapping the printed net around the divided scrap material in the at least one zone in response to determining the divided scrap material has been dropped in the target location; and transporting the net containing the divided scrap material in the at least one zone to the final destination.

2. The computer-based method of claim 1, further comprising:

weaving multiple nets together in the plurality of zones in response to determining at least two nets are printed in the plurality of zones.

3. The computer-based method of claim 1, wherein the net is printed by multiple robotic 3D printers operating simultaneously in the plurality of zones.

4. The computer-based method of claim 3, wherein the multiple robotic 3D printers execute one or more movements in accordance with a color-coded area in the plurality of zones.

5. The computer-based method of claim 1, wherein the one or more characteristics include dimensions of a largest and a smallest item of scrap material, and wherein a space between threads of the net is smaller than the dimensions of the smallest item of scrap material.

6. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer- readable memories, wherein the computer system is capable of performing a method comprising:

receiving images of scrap material in a multi-machine environment;

dividing the scrap material into a plurality of zones based on the images;

identifying one or more characteristics of the divided scrap material in at least one zone of the plurality of zones;

determining whether the divided scrap material is in a target location in the at least one zone;

in response to determining the divided scrap material is in the target location in the at least one zone:

printing a net around the divided scrap material in the at least one zone in accordance with the one or more characteristics of the divided scrap material; and transporting the net containing the divided scrap material in the at least one zone to a final destination; and in response to determining the divided scrap material is not in the target location in the at least one zone:

printing the net on a floor of the target location in the at least one zone in accordance with the one or more characteristics of the divided scrap material, wherein a reinforcement learning model is utilized to predict one or more specifications of the net;

wrapping the printed net around the divided scrap material in the at least one zone in response to determining the divided scrap material has been dropped in the target location; and transporting the net containing the divided scrap material in the at least one zone to the final destination.

7. The computer system of claim 6, the method further comprising:

weaving multiple nets together in the plurality of zones in response to determining at least two nets are printed in the plurality of zones.

8. The computer system of claim 6, wherein the net is printed by multiple robotic 3D printers operating simultaneously in the plurality of zones.

9. The computer system of claim 8, wherein the multiple robotic 3D printers execute one or more movements in accordance with a color-coded area in the plurality of zones.

10. The computer system of claim 6, wherein the one or more characteristics include dimensions of a largest and a smallest item of scrap material, and wherein a space between threads of the net is smaller than the dimensions of the smallest item of scrap material.

11. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving images of scrap material in a multi-machine environment;

dividing the scrap material into a plurality of zones based on the images;

identifying one or more characteristics of the divided scrap material in at least one zone of the plurality of zones;

determining whether the divided scrap material is in a target location in the at least one zone;

in response to determining the divided scrap material is in the target location in the at least one zone:

printing a net around the divided scrap material in the at least one zone in accordance with the one or more characteristics of the divided scrap material; and transporting the net containing the divided scrap material in the at least one zone to a final destination; and in response to determining the divided scrap material is not in the target location in the at least one zone:

printing the net on a floor of the target location in the at least one zone in accordance with the one or more characteristics of the divided scrap material, wherein a reinforcement learning model is utilized to predict one or more specifications of the net;

wrapping the printed net around the divided scrap material in the at least one zone in response to determining the divided scrap material has been dropped in the target location; and transporting the net containing the divided scrap material in the at least one zone to the final destination.

12. The computer program product of claim 11, the method further comprising:

weaving multiple nets together in the plurality of zones in response to determining at least two nets are printed in the plurality of zones.

13. The computer program product of claim 11, wherein the net is printed by multiple robotic 3D printers operating simultaneously in the plurality of zones.

14. The computer program product of claim 13, wherein the multiple robotic 3D printers execute one or more movements in accordance with a color-coded area in the plurality of zones.

15. The computer program product of claim 11, wherein the one or more characteristics include dimensions of a largest and a smallest item of scrap material, and wherein a space between threads of the net is smaller than the dimensions of the smallest item of scrap material.

* * * * *